United States Patent [19]

Coker

[11] Patent Number: 5,016,720

[45] Date of Patent: May 21, 1991

[54] DETACHABLE ELECTRIC DRIVE UNIT FOR COLLAPSIBLE WHEELCHAIR

[76] Inventor: Theodore R. Coker, 5500 N. Bay Ridge Ave., Whitefish Bay, Wis. 53217

[21] Appl. No.: 360,581

[22] Filed: Jun. 2, 1989

[51] Int. Cl.$^5$ .............................................. B60K 1/00
[52] U.S. Cl. ................................... 180/13; 180/907; 74/105; 292/36
[58] Field of Search ................... 180/11, 12, 13, 214, 180/907; 280/304.1, 250.1, 774, 779; 74/105; 292/74, 36

[56] References Cited

U.S. PATENT DOCUMENTS

| | | | |
|---|---|---|---|
| 3,622,187 | 12/1971 | Emergy | 292/36 |
| 4,081,047 | 3/1978 | Lovell et al. | 180/19.3 |
| 4,280,580 | 7/1981 | Wojcik | 180/169 |
| 4,386,672 | 6/1983 | Coker | 180/13 |
| 4,589,124 | 5/1986 | Ruiz | 280/304.1 X |
| 4,720,119 | 1/1988 | Ritter | 280/419 X |

Primary Examiner—Charles A. Marmor
Assistant Examiner—Alan M. Kagen

[57] ABSTRACT

A battery powered steerable electric drive unit for detachable connection to a conventional wheelchair having a collapsible wheelchair frame comprises: a support releasably connectable to the wheelchair frame by an adjustable releasably lockable attachment mechanism; a drive assembly pivotably (steerably) mounted on the support and including a ground-engaging wheel and a battery powered electric motor for driving the wheel; a solenoid-operated brake engageable with a disc-like surface of a pulley in the drive mechanism for the wheel; a detachable steering column having a handle mounted thereon and pivotably and rotatably mounted on the support; an adjustable steering mechanism mounted on the support and connected between the steering column and the drive assembly to effect steering when the steering column is rotated about its longitudinal axis; and an electric controller comprising an off-forward-reverse switch, a speed control switch and a brake switch mounted on the handle, and further comprising a solid-state electronic control circuit mounted on the support and responsive to operation of the switches to control the motor and the brake.

7 Claims, 7 Drawing Sheets

DETACHABLE ELECTRIC DRIVE UNIT FOR COLLAPSIBLE WHEELCHAIR

Background Of The Invention

1. Field of Use

This invention relates to an improved detachable electric drive unit for a collapsible wheelchair and, particularly, to an adjustable releasably lockable attachment mechanism, an adjustable steering mechanism, a brake mechanism, and an electronic control circuit therefor.

2. Description of the Prior Art

My U.S. Pat. No. 4,386,672 issued June 7, 1983 entitled "DETACHABLE ELECTRIC DRIVE UNIT FOR WHEELCHAIR" discloses a battery powered steerable electric drive unit for detachable connection to a conventional wheelchair. The drive unit comprises: a framework or support releasably connectable to the wheelchair frame by snap-on connectors; a drive assembly pivotably(steerably) mounted on the framework and including a ground-engaging drive wheel and a battery powered electric motor for driving the drive wheel; a detachable steering column pivotably and rotatably mounted on the framework and operatively connected to the drive assembly to effect steering when rotated about its longitudinal axis; a handle mounted transversely on the steering column and rotatable in opposite directions to various positions about its horizontal longitudinal axis; and an electric controller including switches responsive to handle rotation to control the direction and speed of motor rotation.

SUMMARY OF THE PRESENT INVENTION

The present invention provides an improved battery powered steerable electric drive unit for detachable connection to the lower part or portion of a conventional wheelchair having a collapsible wheelchair frame. The drive unit comprises: a framework releasably connectable to the wheelchair frame by an adjustable releasably lockable attachment mechanism; a drive assembly pivotably (steerably) mounted on the framework and including a ground-engaging wheel and a battery powered electric motor for driving the wheel; a detachable steering column having a handle mounted thereon and pivotably and rotatably mounted on the framework; an adjustable steering mechanism mounted on the framework and connected between the steering column and the drive assembly to effect steering when the steering column is rotated about its longitudinal axis; a solenoid-operated wheel brake mechanism mounted on the framework and having pads engageable with a smooth web of an intermediate pulley for driving the wheel; and an electronic controller, including an off-forward-reverse switch, a speed control switch and a brake switch mounted on the handle, and further comprising a solid state electronic control circuit mounted on the framework and responsive to operation of the switches to control the direction and speed of motor rotation and motor braking The improved attachment mechanism is adjustable to enable the unit to fit conventional wheelchairs which are similar in construction but may differ in size and, furthermore, to positively but releasably lock the unit securely to the wheelchair.

The improved steering mechanism employs a steering linkage which is simpler and more economical to fabricate than prior art steering mechanisms, which typically employ sprockets and chains, and also employs turnbuckles which are adjustable in the factory or in the field to remove slack or looseness caused by use and wear to therby ensure positive and responsive steering of the steerable unit.

The improved solenoid-operated wheel brake mechanism ensures that the unit and the wheelchair on which it is mounted is immobilized and remains so while the brake is actuated by a microswitch thereby enhancing the safety of the occupant.

The improved control circuit provides for positive motor speed control in both forward and reverse and eliminates the need for large energy-dissipating electric resistors which are used in prior art controls and are wasteful of battery power. The control circuit also effects dynamic braking.

Other objects and advantages of the invention will hereinafter appear.

DESCRIPTION OF A PREFERRED EMBODIMENT

Wheelchair

Figure 1:
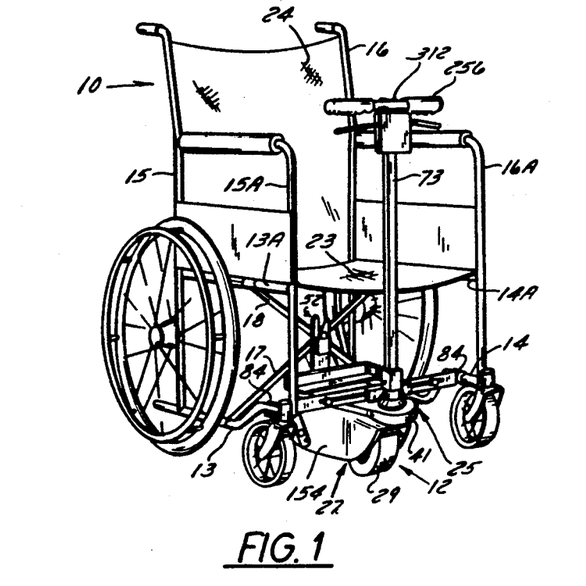
FIG. 1 is a perspective view of the right front of a conventional wheelchair using a detachable steerable controllable battery-powered electric drive unit in accordance with the invention.
Figure 2:
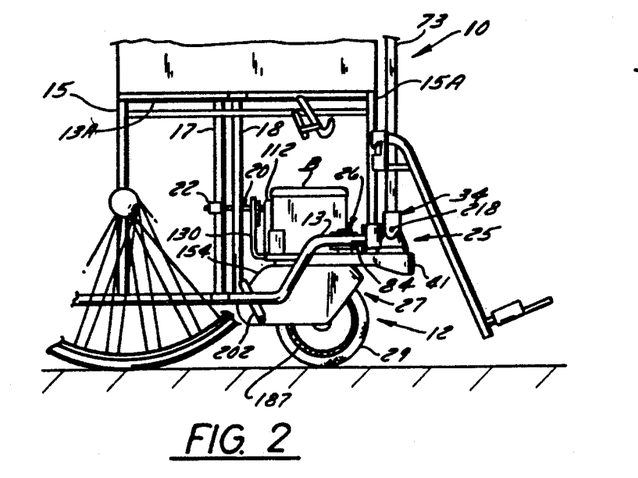
FIG. 2 is a side elevation view of a portion of the wheelchair and drive unit of FIG. 1.
Figure 3:
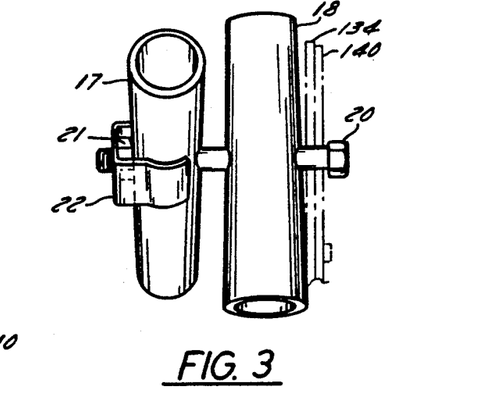
FIG. 3 is an enlarged view of a pivot bolt on the wheelchair to which the drive unit is connectable.

Referring to FIGS. 1 and 2, the numeral 10 designates a conventional commercially available foldable wheelchair on which is mounted a detachable steerable controllable battery powered electric drive unit 12 in accordance with the invention. Wheelchair 10 comprises a frame which includes a pair of laterally spaced apart, forwardly and rearwardly extending lower horizontal tubular frame members 13 and 14 and upper frame members 13A and 14A. The frame members 13 and 14 are slidably connected to the lower ends of the rear frame members 15 and 16, respectively, and to the lower ends of the front frame members 15A and 16A, respectively. Cross braces 17 and 18 are pivotally connected at each end to members 13 and 14A and to members 14 and 13A in the conventional manner and, as FIG. 3 shows, are pivotally connected to each other by an elongated bolt 20 which has a nut 21 thereon and which allows scissors-like movement of the cross-braces as wheelchair 10 is folded or unfolded. A bracket 22 is in clamped engagement with cross-brace 17 and bears against the nut 21 of bolt 20 to maintain the bolt head in an accessible forward position. Flexible webs 23 and 24 define a seat and backrest, respectively, and allow folding and unfolding.

Drive Unit

Figures 4, 13:
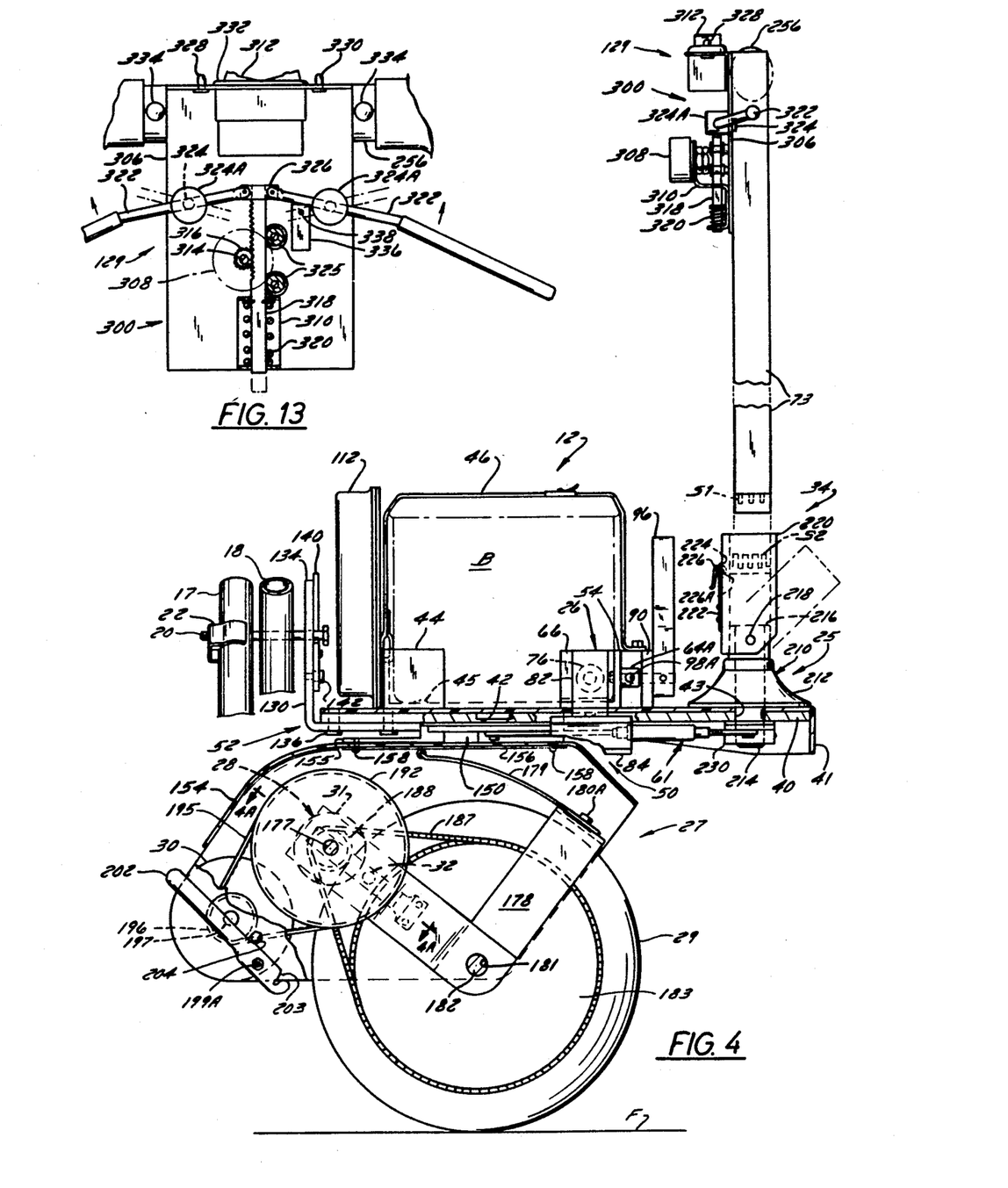
FIG. 4 is an enlarged side elevation view of the drive unit of FIGS. 1 and 2.
FIG. 13 shows the electromechanical controls.
Figure 5:
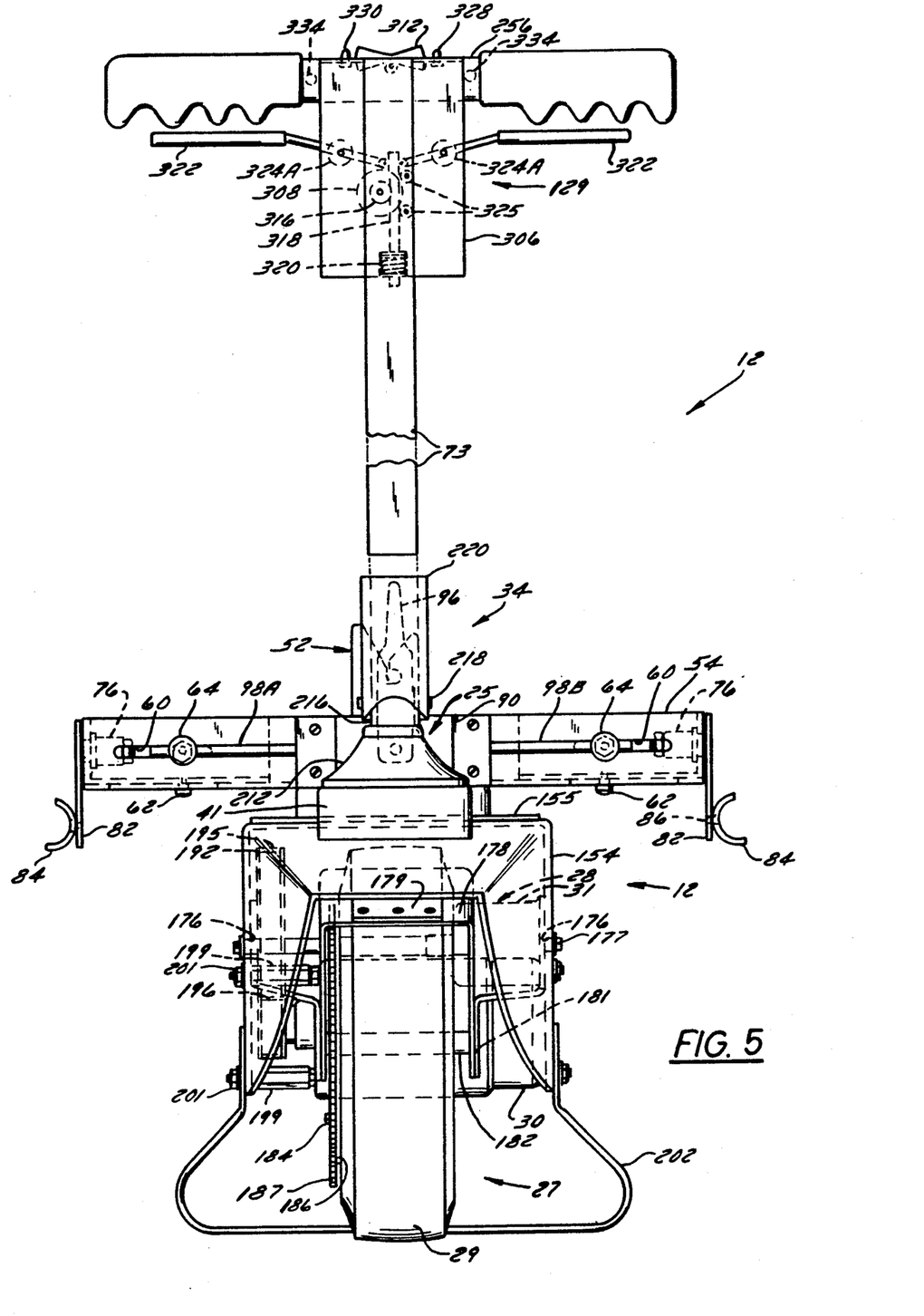
FIG. 5 is a front elevation view of the drive unit of FIG. 4.
Figure 6:
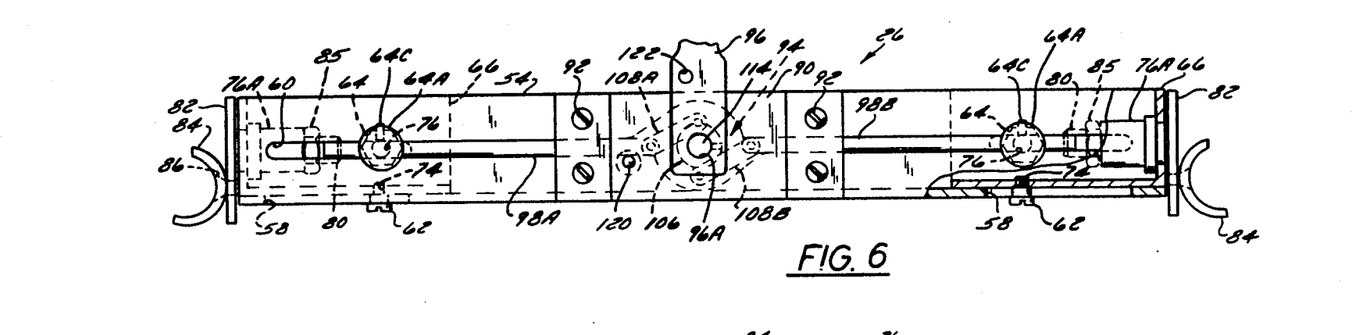
FIGS. 6, 7 and 8 are enlarged front, top and rear elevation views, respectively, of the attachment means shown in FIG. 5.
Figure 7:
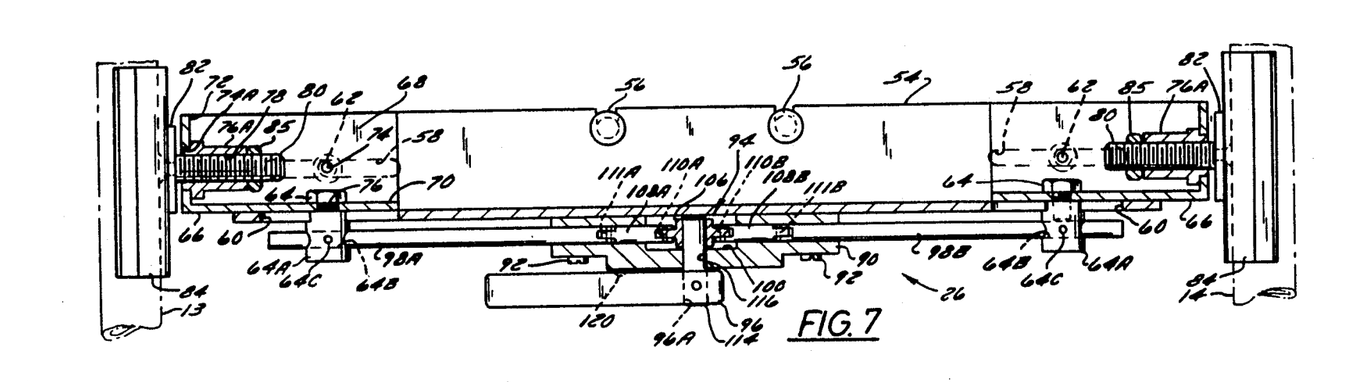

Generally considered, and as FIGS. 4 and 5 show, drive unit 12 comprises support means 25 for the several components thereof; adjustable attachment means 26 to enable drive unit 12 to be releasably attached to wheelchair 10 which could be one of various sizes; steerable drive means 27 pivotally (steerably) mounted on support means 25 and including a ground-engaging drive wheel 29 and an electric motor 30 therefor to enable drive unit 12 and wheelchair 10 attached thereto to be propelled and steered in various directions by the wheelchair occupant; steering means 34, including a rotatable steering column 73 mounted on support means 25 and connected by a steering linkage 61 to drive means 27, to enable the occupant to effect steering; brake means 28 on drive means 27, including an electric brake solenoid 31 engageable with a brake disc surface 192A on a pulley 192, to enable the occupant to slow and stop drive wheel rotation; and control means, including a switch assembly 129 on steering column 73 and an electronic control unit 112 on support means 25, to enable the occupant to control energization of drive motor 30 and brake solenoid 31 from an electric storage battery B, mounted on support means 25 and thereby control the direction (forward or reverse) and speed of rotation and braking of drive wheel 29.

Support Means

FIGS. 4 and 5 show that support means 25 comprises a rigid metal support plate 40 which is covered by a plastic enclosure 41 and is provided with two large access holes 42 and 43 and several threaded screw holes. Two battery support brackets 44 are secured to the upper side of plate 41 by a plurality of screws 45 and the brackets have battery-securing straps 46 thereon.

Attachment Means

FIGS. 4 through 9 show that attachment means 26 comprises first connection means 50 and second connection means 52 located near the front and rear ends, respectively, of support plate 40. First connection means 50 is releasably engageable with the frame members 13 and 14 of wheelchair 10. Second connection means 52 is releasably engageable with the head on bolt 20 which secures the cross braces 17 and 18 together First connection means 50 comprises an elongated rigid cross member 54 which is rigidly secured to support plate 40 by screws 56 and extends laterally therefrom. Member 54, which takes the form of an angle-iron, is provided with elongated slots 58 and 60 near each of its outer ends for slidably receiving cap screws 62 and 64, respectively, which adjustably secure support brackets 66 to the ends of cross member 54. Each bracket 66 takes the form of a short piece of angle-iron having side plates 68 and 70 and an integrally formed end plate 72. Side plate 68 has a threaded hole 74 for receiving a cap screw 62 which extends through slot 58 and permanently but loosely secures the bracket 66 to cross member 54. The side plate 70 has a hole 76 for receiving the threaded shank portion of screw 64 which extends into a bushing 64A in slot 60 in cross-member 54. Screw 64 threads into a threaded hole in bushing 64A and slidably secures its associated bracket 66 in a position into which it has been adjustably moved manually when the drive unit 12 is first installed on a wheelchair 10 of a specific size and in which the distance between the frame members 13 and 14 is of a certain dimension when the wheel chair is unfolded. Bushing 64A has a bore 64B extending transversely therethrough for receiving a rod 98A hereinafter described and also carries a set-screw 64C which is tightened to fixedly secure the rod 98A to the bushing 64A.

End plate 72 is provided with a hole 74A in which a hollow, internally-threaded steel bushing 76A is rigidly mounted. The threaded bore 78 of bushing 76A receives the threaded shank of a screw 80 which is rigidly secured as by welding or brazing to a plate 82. A locknut 85 is disposed on screw 80. Plate 82 supports a connector 84 which is rigidly secured thereto by a screw 86 and which has a laterally outwardly facing opening a hemispherical cross-sectional configuration (see FIGS. 6, 7 and 8) to enable it to matingly engage a respective tubular frame member 13 or 14 on wheelchair 10. During initial installation of drive unit 12, the wheelchair 10 is unfolded and drive unit 12 is placed between the frame members 13 and 14. Then, the two support brackets 66 at the opposite ends of cross-member 54 are slidably adjusted so that the hemispherical connectors 84 engage the frame members 13 and 14. If necessary, the connectors 84 are adjustably positioned by the screws 80 and the locknuts 85 are tightened. Then, set-screw 64C is tightened to secure bushing 64A to a respective rod 98A or 98B. This will necessarily be a relatively loose fit as regards attachment of the drive unit 12 to wheelchair 10. Therefore, manually operable means are provided to effect further outward lateral movement of the brackets 66 and the connectors 84 and to releasably lock them in that position.

Such means comprise a support block 90 which is rigidly secured to cross-member 54 by screws 92 and mounted thereon are a linkage 94, a pair of axially movable rods 98A and 98B and a manually operable lever 96 for operating the linkage. Support block 90 has a recess formed on the inner surface thereof which defines a cavity 100. The interior surface of block 90 is machined to provide cam surfaces 104.

Linkage 94 comprises a central hub 106 which has a hole 107 therethrough and is disposed in cavity 100. Two links 108A and 108B are pivotally connected at one end by pins 110A and 110B, respectively, to opposite sides of hub 106. The other ends of the links 108A and 108B are pivotally connected by pins 111A and 111B, respectively, to the inner ends of the rods 98A and 98B, respectively. The lever 96 has a hole 96A therethrough for receiving a pivot pin 114 to which it is rigidly secured. Pin 114 extends through and is rotatable in a hole 116 through block 90. Pin 114 extends into a hole 107 in hub 106 and is rigidly secured to the hub. A spring-loaded latch 120 is mounted on the outer surface of block 90 and is releasably engageable with latch detent hole 122 in lever 96. The outer ends of the rods 98A and 98B extend into the bores 64B of the bushings 64A.

Figure 8:
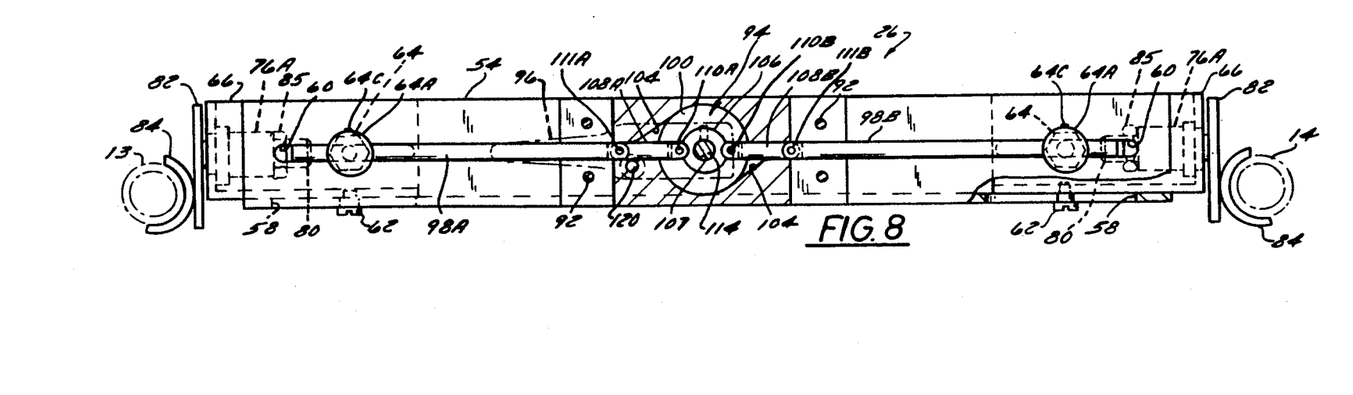

When lever 96 is in its unlocked position, the outer ends of the rods 98A and 98B are retracted inwardly (FIGS. 6 and 7) and, thus, the connectors 84 are laterally movable outwardly for a short distance (see FIG. 8) to enable them to be engaged with the members 13 and 14. However, as FIG. 8 shows, during attachment of drive unit 12 to wheelchair 10 and after the connectors 84 are engaged, manual rotation of lever 96 to locked position causes outward movement of the rods 98A and 98B thereby forcing the connectors 84 into tight engagemnet with the members 13 and 14 of wheelchair 10. The flexible webs 23 and 24 on the wheelchair 10 allow for some play in outward movement of the members 13 and 14. When lever 96 reaches its locked position, latch 120 releasably engages detent hole 122 in the lever The second connection means 52 hereinbefore referred to and shown in FIG. 9 comprises an L-shaped bracket 130 having an horizontal lower plate 132 and a vertically upright plate 134. Lower plate 132 is adjustably secured to the underside of drive unit support plate 40 by screws 136 which extend through elongated screw-receiving slots 138 in lower plate 132 and threadedly engage threaded holes provided in support plate 40. Thus, bracket 130 is adjustably positionable, for example, between a forward position shown in solid lines in FIG. 4 and a rearward position shown in dashed lines in FIG. 3 so as to accommodate the drive unit 12 to wheelchairs of different sizes. Upright plate 134 of bracket 130 has a connector plate 140 pivotally attached thereto by a bolt 142. The edges of plate 134 and plate 140 cooperate to define a groove 144 for receiving the shank of bolt 20 on wheelchair 10 and plate 140 is pivotally movable between an open position and a springbiased locked position (FIG. 9) wherein bracket 130 is rigidly and securely, but releasably, connected to bolt 20.

DRIVE MEANS

FIGS. 1, 2, 4, 4A and 5 show that the steerable drive means 27 is pivotally mounted on the underside of support plate 40 and comprises a plastic housing 154 which is re-enforced on its upper side by an upper metal plate 155 and a lower metal plate 156. Housing 154 is rigidly secured by screws 158 to the underside of a bolster plate 150, which is hereinafter described in detail as part of the steering means 34(see FIG. 11). Bolster plate 150 is rotatably secured to the underside of support plate 40 by means of a large stud 162 which extends through access hole 42 in support plate 40 and through a bearing 164 which is mounted on bolster plate 150. A teflon anti-friction plate 168 is disposed between bolster plate 150 and support plate 40. Thus, housing 154 is able to rotate about a vertical axis of rotation X relative to support plate 40.

Housing 154 includes a pair of holes 176 in the sidewalls thereof for accommodating a long shaft 177 on which a wheel support bracket 178 is pivotally or rockably mounted by means of a pair of holes 180 in the ends of bracket 178. A biasing spring 179, held in place by screws 180A to bracket 178, operates to limit travel and to provide a biased suspension for bracket 178. Bracket 178 includes another pair of holes 181 for receiving and supporting an axle 182 on which wheel 29 is rotatably mounted. Wheel 29 is provided with a driven wheel sprocket 183 which is rigidly secured to a side of wheel 29 by bolts 184. Sprocket 183 is spaced outwardly from the side of wheel 29 for an appropriate distance by a large spacer or washer 186.

Driven wheel sprocket 183 is connected by an endless flexible drive chain 187 to a small drive sprocket 188 which is rigidly secured to a drive pulley 192. Pulley 192 is connected by an endless flexible drive belt 195 to a small drive pulley 196 which is rigidly secured to the drive shaft 197 of motor 30. Motor 30 is rigidly secured to the rear interior of housing 154 by a pair of long bolts 199 which extend through holes in housing 154 and which have nuts 201 thereon. Spacers are provided on the bolts 199. The forgoing arrangement allows wheel 29 to move up or down on a resilient suspension to accommodate surface irregularities beneath the wheel while ensuring that drive belt 195 remains taught and fully effective to transmit power to the wheel 29 from the relatively stationary motor 30.

A U-shaped support member 202 is pivotally connected to housing 154 near the rear thereof by means of bolts 199A. When member 202 is swung down, as shown in FIG. 5, it raises wheel 29 off the floor F (FIG. 4) and facilitates attachment or removal of drive unit 12 by preventing it from rolling or shifting. In down position, support member 202 has slots 203 which releasably receive spring-pins 204 on housing 154 to thereby prevent the support member 202 from accidentally swinging upward to its raised, stored position.

Figure 4A:
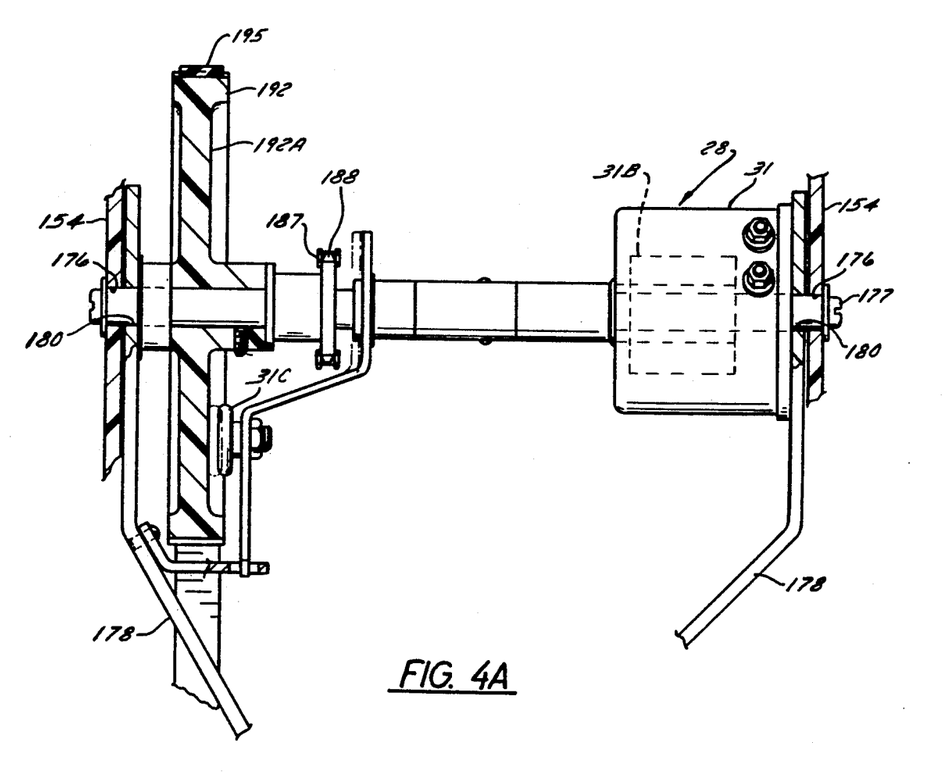
FIG. 4A is a front elevation view, partly in cross-section, of the brake mechanism taken on line 4A—4A of FIG. 4.
Figure 12:
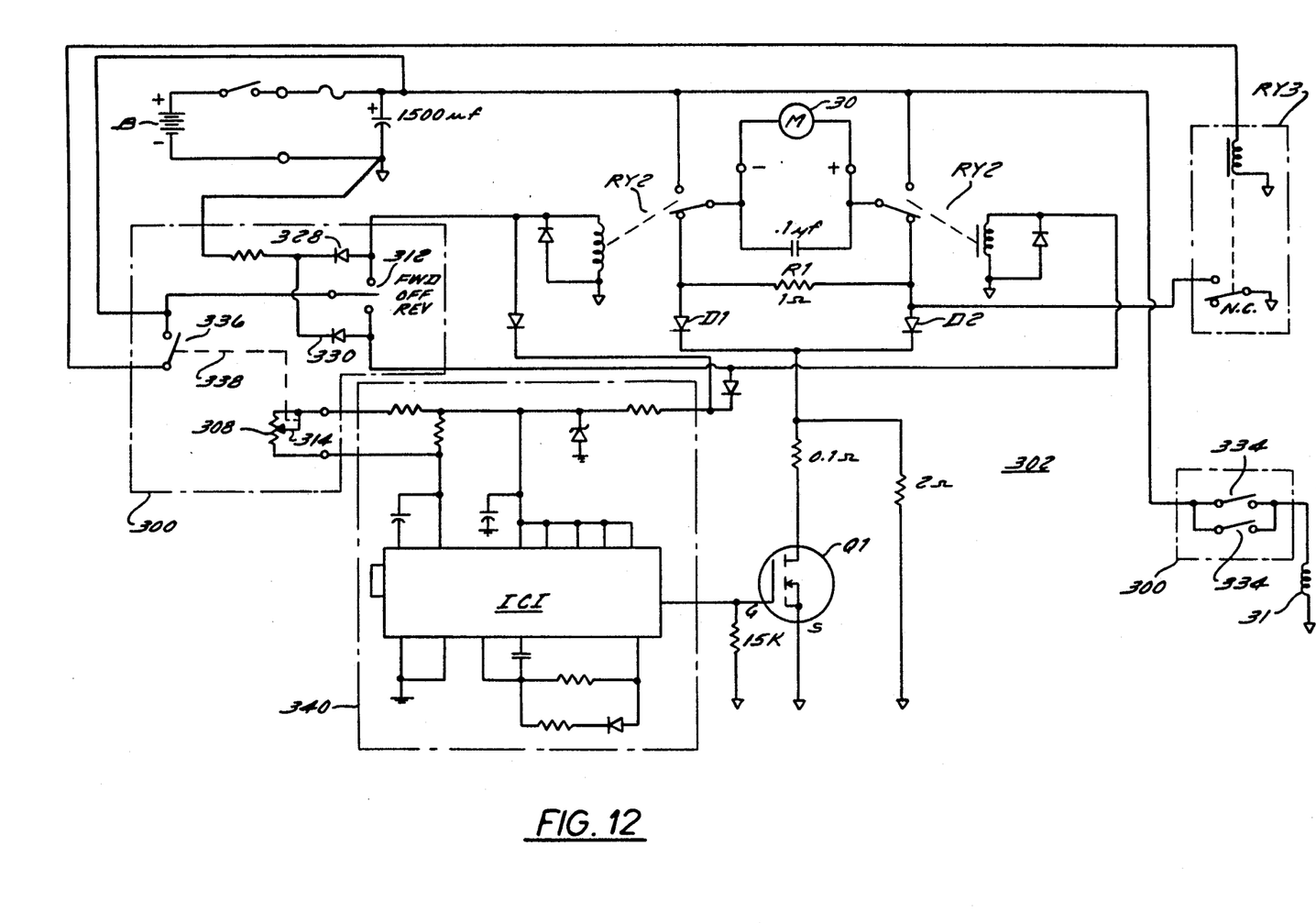
FIG. 12 is a circuit diagram of control means for the drive unit.

As FIG. 4A shows, an electric brake solenoid 31 is rigidly secured within housing 154 to bracket 178 in a location wherein its axially movable solenoid armature 31B, which has two brake pads 31C thereon (only one shown in FIG. 4A), can move axially into engagement with pulley web 192A to effect braking whenever the solenoid is energized by the occupant by depressing either of the pushbutton switches 334 shown in FIGS. 12 and 13.

STEERING MEANS

FIGS. 4, 5, 10 and 11 show that the steering means 34 includes the steering column 73, a means or assembly 210 by which it is rotatably mounted on support plate 40, the hereinbefore-mentioned bolster plate 150 and the steering linkage 61 which is connected between the steering column and the bolster plate.

Figures 9, 11:
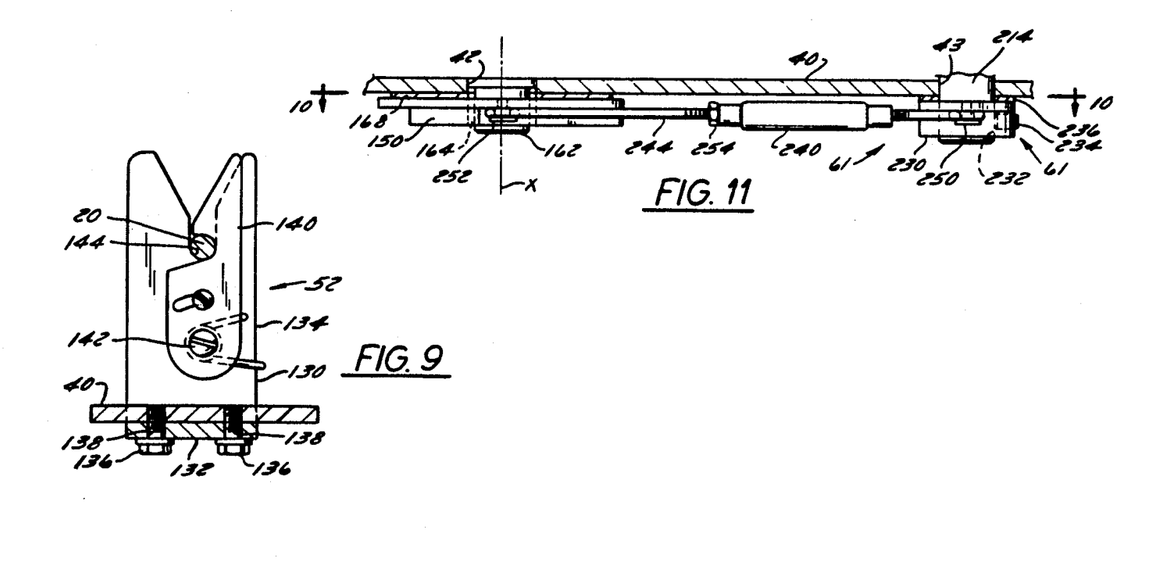
FIG. 9 is an enlarged front elevation view of another portion of the attachment means.
FIGS. 10 and 11 are top and side elevation views, respectively, of a portion of the steering mechanism.
Figure 10:
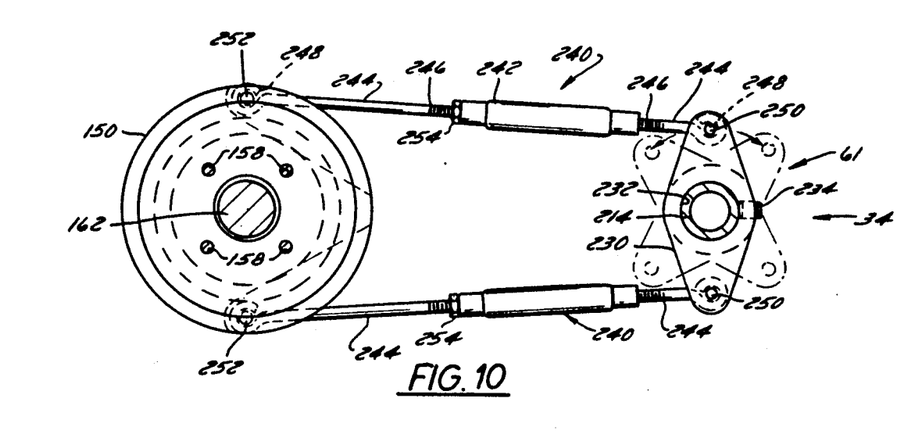

The assembly 210 comprises a hollow bushing 212 which is disposed on the upper surface of support plate 40 concentrically with the forward access hole 43 therethrough, a short shaft 214 which extends through bushing 212 and hole 43, a collar 216 on the upper end of shaft 214 and which rests on the upper end of bushing 212, a pivot pin 218 which secures collar 216 on shaft 214, and a hollow socket 220 which is pivotally connected to shaft 214 by pin 218. Socket 220 is adapted to have the lower end of steering column 73 axially inserted thereinto and is provided on its exterior with a manually-operable latch 222, made of resilient metal, having a tang 224 which extends through a hole 226 in the socket wall and into a latch hole 226A in the side of steering column 73. Latch 222 is pulled manually to withdraw tang 224 from latch hole 226 and allow steering column 73 to be withdrawn upwardly out of the socket. Column 73 and socket 220 contain electrical socket components S1 and S2.

The steering linkage 61, which is located below support plate 40, comprises a steering link 230 having a central hole 232 for receiving the lower end of shaft 214 to which it is rigidly secured by a set screw 234. A washer 236 is provided on the shaft between link 230 and the underside of support plate 40. Each lateral end of link 230 is connected by a pushrod assembly 240 to one side of the bolster plate 150 hereinbefore described.

Each pushrod assembly 240 comprises a turnbuckle sleeve 242 threaded at opposite ends and rods 244 threadedly connected to opposite ends of the sleeve. Each rod 244 has threads 246 at one end and is provided with a screw-receiving hole 248 at its other end. Each pushrod assembly 240 has its forward end pivotally connected by a screw 250 to one end of link 230 and has its rear end pivotally connected by a screw 252 to one side of bolster plate 150. In operation, rotation of steering column 73 about its vertical axis effects corresponding rotation of shaft 214 link 230, bolster plate 150 and drive unit 12. During assembly of drive unit 12 and subsequently in the field, if necessary, the turnbuckle sleeves can be rotated so that the pushrods are of proper length and steering is tight. A locknut 254 is provided against the rear end of each turnbuckle sleeve to prevent undesired rotation and maladjustment.

Steering column 73 has a horizontally disposed, transversely extending handle 256 rigidly secured thereto to enable the occupant to rotate the steering column about its vertical axis to effect steering. Steering column 73 is also pivotable downwardly (see FIG.4) to enable drive unit 12 and wheelchair 10 attached thereto to be operated and guided by an attendant.

CONTROL MEANS

Referring to FIGS. 12 and 13, the control means generally comprise electro-mechanical control apparatus 300 located at the top of control column 73 and a solid state control circuit 302 located in unit 112 mounted on the battery support brackets 44 and electrically connected by suitable wiring to the apparatus 300, as well as to a 12 volt DC storage battery B which operates motor 30 which, for example, is a 12 volt DC reversible electric motor. Battery B also energizes brake solenoid 31. In FIGS. 4 and 13, the cover for portions of the apparatus 300 is not shown.

The apparatus 300 comprises a mounting board 306 rigidly secured to column 73, a potentiometer or rheostat 308 mounted on the board by means of a bracket 310 and an off-forwardreverse toggle switch 312 to control the direction of rotation of motor 30. Potentiometer 308 has a rotatable shaft 314 for changing the resistance thereof to effect speed changes of motor 30. Shaft 314 has a pinion gear 316 affixed thereon which meshes with a toothed rack 318 which is slidably supported on bracket 310 and biased upwardly by a spring 320. A pair of rollers 325 bear against rack 318 to hold it into engagement with the pinion gear. Rack 318 is movable downwardly against spring bias in response to manual movement of either of two switch actuator levers 322. Each lever 322 is pivotally mounted on board 306 by a pivot pin 324 on a bushing 324A attached to the board and has its inner end pivotally connected to the upper end of rack 318 by a pin 326. If preferred, a slide potentiometer (not shown) could be used instead of potentiometer 308 to perform the same function. When lever 322 is moved full up, motor 30 runs at full speed and when full down causes motor 30 to run at a very slow speed. Light emitting diodes 328(red) and 330(green) are mounted on switchplate 332 of directional switch 312 and each lights up to indicate the direction of movement which was selected. A pair of microswitches 334 are mounted on handle 256 to control energization of brake solenoid 31 and to effect braking when either of the microswitches is depressed.

A bypass switch 336 is mounted on board 306 and operates a relay RY3 to bypass the switching transistor when the potentiometer 308 is moved to maximum speed position i.e., when a lever 322 is in full up position and depresses the microswitch actuator button 338, but switch 336 only functions in the forward direction.

As FIG. 12 makes clear, the solid state control module or unit 302 includes a pulse width modulation circuit 340 which incorporates, for example, a type MC 14528B dual monostable multivibrator designated as IC1. One half is connected in an astable mode, producing a pulsed oscillation. The other half is then used as a one-shot, with its adjustable pulse width determining the duty cycle and, therefore, motor speed. The input signal to IC1 is from potentiometer 308 and the output signal is sent to a type MTH 351105 FET transistor, for example, designated Q1. The power signal from circuit 340 is supplied to the relays designated RY1 and RY2 which are energized in response to the position of directional switch 312 to effect connection of motor 30 directly to battery B for operation in either the forward or reverse direction. A relay RY3 is controlled by bypass switch 336 and operates to bypass FET transistor Q1 and to connect motor 30 directly to the negative terminal of battery B when motor 30 is running at full speed.

When potentiometer 308 is set at zero resistance, motor 30 runs at minimum speed and delivers approximately 30 percent power. At maximum potentiometer resistance, motor 30 runs at full speed. In addition to the solenoid braking function which is available, dynamic braking also occurs when the motor leads are switched to a resistor R1 by the relays RY1 and RY2.

I claim:

1. In an electric drive unit for a collapsible wheelchair having a pair of laterally spaced apart, laterally movable frame members near the lower part of said wheelchair and a pair of movable cross members pivotally connected together by a pivot pin:
    support means for disposition between said pair of frame members and forward of said pivot pin;
    adjustable connecting means mounted on said support means for releasably connecting said drive unit to said frame member sand to said pivot pin, said adjustable connecting means including connectors disposed on opposite lateral sides of said support means, each one of said connectors having an opening which faces laterally outwardly and being laterally movable into and out of mating engagement with its respective frame member, and means including a lever located between said pair of frame members near the lower part of said wheelchair and operable to effect outward lateral movement of said connectors whereby both connectors are forced into tight locking engagement with their respective frame members;
    drive means pivotally mounted on said supported means and comprising a reversible electric motor and a wheel driven thereby and an electrically operable brake;
    steering means mounted on said support means and comprising a rotatable steering column and a steering mechanism connecting said steering column to said drive means;
    and control means comprising switch means supported on said steering column for controlling the direction and speed of rotation of said motor and operation of said brake.

2. In an electric drive unit for a collapsible wheelchair having a pair of laterally spaced apart, laterally movable frame members near the lower part of said wheelchair and a pair of movable cross members pivotally connected together by a pivot pin:
    support means for disposition between said pair of frame members and to said pivot pin;

and adjustable connecting means mounted on said support means for releasably connecting said drive unit to said frame members and to said pivot pin;

said adjustable connecting means comprising connectors disposed on opposite lateral sides of said support means for releasable engagement with said frame members, each one of said connectors having an opening which faces laterally outwardly and being movable laterally relative to its respective frame member into and out of mating engagement with said respective frame member, said adjustable connecting means further comprising manually operable means including a lever located between said pair of frame members near the lower part of said wheelchair and operable to effect lateral movement of said connectors into and out of engagement with their respective frame members.

said adjustable connecting means further comprising means for releasably locking said connectors into engagement with said frame members after said connectors are laterally forced into tight engagement with their respective frame members.

3. An electric drive unit according to claim 2 wherein said manually operable means comprises a manually movable lever and linkage means connected between said lever and said connectors.

4. An electric drive unit according to claim 3 wherein said means for releaseably locking said connectors comprises a latch releasably engageable with said lever.

5. In an electric drive unit for a collapsible wheelchair having a pair of laterally spaced apart, laterally movable frame members near the lower part of said wheel chair and a pair of movable cross members pivotally connected together by a pivot pin:

support means for disposition between said pair of frame members and forward of said pivot pin and comprising a support plate;

adjustable connecting means mounted on said support means for releasably connecting said drive unit to said frame members and to said pivot pin, said adjustable connecting means including connectors disposed on opposite lateral sides of said support means, each one of said connectors having an opening which faces laterally outwardly and being laterally movable into and out of mating engagement with its respective frame member, and means including a level located between said pair of frame members near the lower part of said wheelchair and operable to effect outward lateral movement of said connectors whereby both connectors are forced into tight locking engagement with their respective frame members;

drive means pivotally mounted on said support means and comprising a reversible electric motor and a wheel driven thereby and a electrically operable brake;

and steering means mounted on said support plate and comprising a rotatable steering column mounted on the upper side of said support plate and a steering mechanism connecting said steering column to said drive means, said steering mechanism comprising a bolster plate rotatably mounted on the lower side of said support plate and fixedly secured to said drive means, said steering mechanism further comprising a steering link fixedly secured to said steering column at the underside of said support plate, said steering mechanism also comprising a pair of steering rods, each rod having one end pivotally connected to one lateral end of said steering link and having its opposite end pivotally connected to one later side of said bolster plate.

6. An electric drive unit according to claim 5 wherein each steering rod includes means to longitudinally adjust its effective length.

7. In an electric drive unit for a collapsible wheelchair having a pair of laterally spaced apart, laterally movable frame members near the lower part of said wheelchair and a pair of movable cross members pivotally connected together by a pivot pin:

support means for disposition between said pair of frame members and forward of said pivot pin;

adjustable connecting means mounted don said support means for releasably connecting said drive unit to said frame members and to said pivot pin, said adjustable connecting means including connectors disposed on opposite lateral sides of said support means, each of said connectors having an opening which faces laterally outwardly and being laterally movable into and out of mating engagement with its respective frame member, and means including a lever located between said pair of frame members near the lower part of said wheelchair and operable to effect outward lateral movement of said connectors whereby both connectors are forced into tight locking engagement with their respective frame members;

drive means pivotally mounted on said support means and comprising a reversible electric motor and a wheel driven thereby and an electrically operable brake;

steering means mounted on said support means and comprising a rotatable steering column and a steering mechanism connecting said steering column to said drive means;

and control means comprising switch means supported on said steering column for controlling the direction and speed of rotation of said motor and operation of said brake, said switch means including a switch having forward, off and reverse positions for controlling the direction of motor rotation and a rheostat for controlling the speed of motor rotation, said switch means further comprising at least one manually operable lever pivotally supported on said steering column for effecting operation of said rheostat.

* * * * *